March 27, 1962     F. M. GRIETEN     3,027,114
SEALED BRAKE MECHANISM FOR A FISHING REEL
Filed May 17, 1960     2 Sheets-Sheet 1
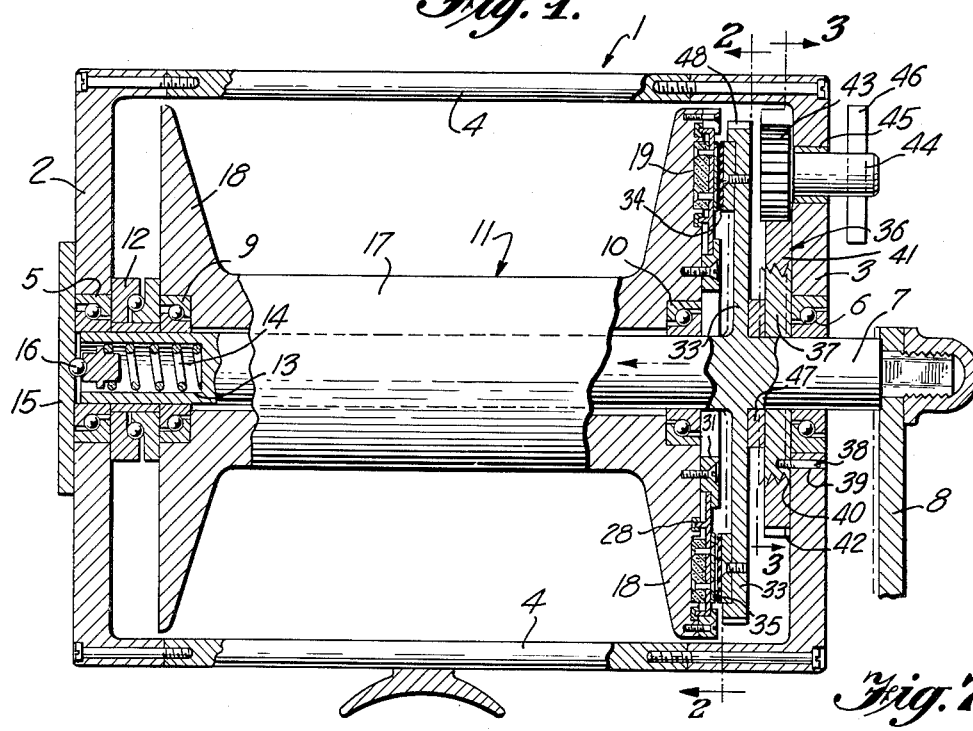
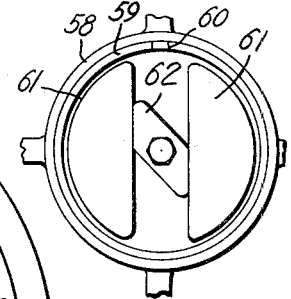
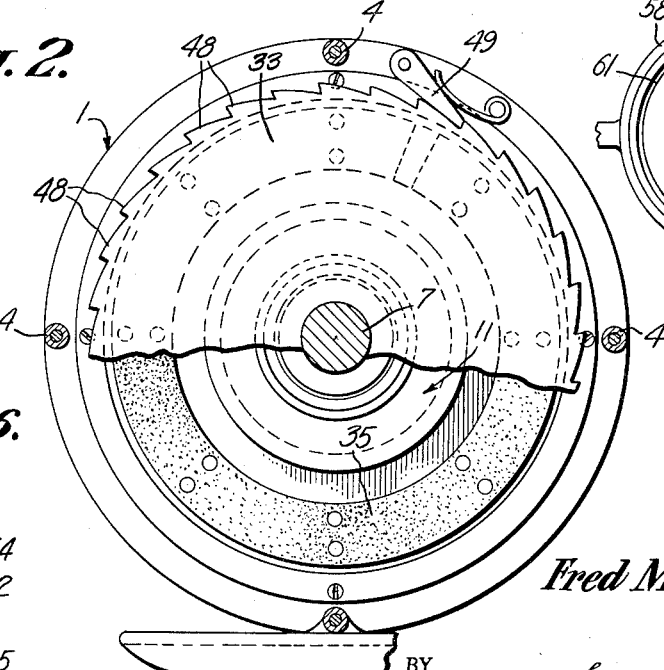
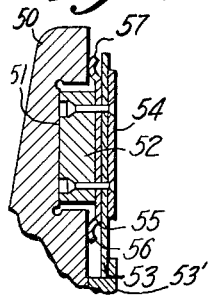
INVENTOR
Fred M. Grieten
BY
Mason, Fenwick & Lawrence
ATTORNEYS March 27, 1962 F. M. GRIETEN 3,027,114
SEALED BRAKE MECHANISM FOR A FISHING REEL
Filed May 17, 1960 2 Sheets-Sheet 2

INVENTOR
*Fred M. Grieten*

BY
*Mason, Fenwick & Lawrence*
ATTORNEYS

United States Patent Office 3,027,114
Patented Mar. 27, 1962

3,027,114
SEALED BRAKE MECHANISM FOR A
FISHING REEL
Fred M. Grieten, Rte. 2, Box 65A, Live Oak, Fla.
Filed May 17, 1960, Ser. No. 29,632
6 Claims. (Cl. 242—84.45)

This invention relates to brakes, and particularly to brake mechanisms which are adapted to be used where there is danger of water, or other foreign matter, entering between the brake member and the drum, spool, or other member with which it coacts, and thereby prevent proper braking action.

It has long been recognized that a brake which is sealed against the entry of foreign matter should have better braking qualities and longer life than those now in common use. Many attempts have been made to provide such a brake, but when a seal is provided it has developed a drag upon the wheel, spool, shaft, or other member the brake is to control. It is essential, however, that the brake, when released, allow the controlled member complete rotative freedom without drag of any kind. This is particularly true with fishing reels, for example, where drag upon the spool will prevent free spooling which is indispensable for proper casting.

The object of the present invention is to provide an improved brake which will have the effect of a sealed structure, yet will allow the controlled member complete freedom of rotation when the brake is released.

Another object is to provide a brake structure wherein the mating brake surfaces remain in contact at all times so that no foreign matter may get between them.

A further object is the provision of such a brake in which the continuously contacting braking surfaces are caused to have relative movement, and therefore braking action, by clutching one of the members to a third element.

Yet another object is to provide a structure of this kind with means to vary the clutching pressure of the members and, by controlling the clutching action, control the degree of braking applied to the device.

It is a still further object of the invention to provide a brake mechanism wherein the clutching elements are yieldably held separated except when the brake is to be applied so that there will be no drag whatever upon the controlled member.

Other objects of the invention will become apparent from the following description of practical embodiments thereof, when taken in conjunction with the drawings which accompany, and form part of, this specification.

In the drawings:

FIGURE 1 is a vertical, longitudinal section through a fishing reel having a brake structure incorporating the principles of the present invention;

FIGURE 2 is a transverse section through the structure, taken on the line 2—2 of FIGURE 1;

FIGURE 6 is a fragmentary sectional view showing a portion of the spool flange and brake plate of a slightly modified structure; and FIGURE 7 is a somewhat schematic showing of the principles of the present invention applied to a drum type brake.

In general, the invention concerns a brake structure wherein the braking element is in close surface contact with the drum or spool it is to control, and rotates with it when there is to be no braking action, and is held against rotation with that member by clutching engagement with another member when the brake is to be applied. The structure includes means to shield the mating braking surfaces from water or other foreign material.

Figure 3:
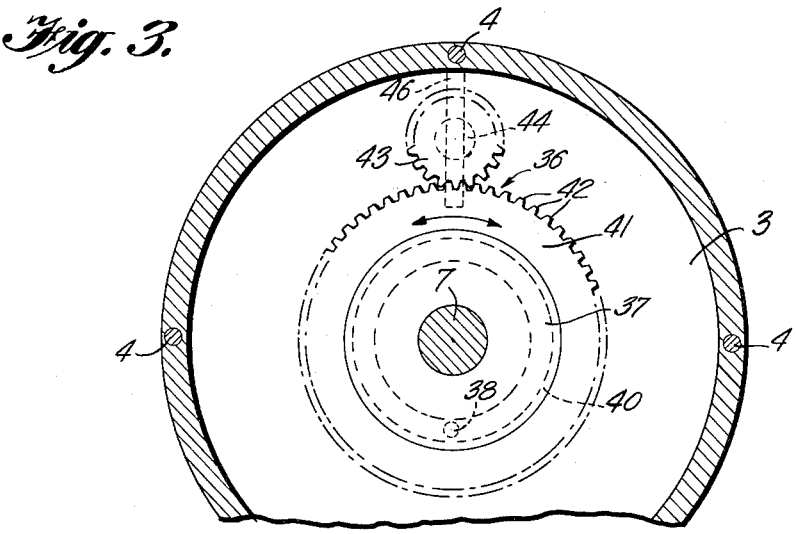
FIGURE 3 is another transverse section through the reel, taken on the line 3—3 of FIGURE 1.
Figure 4:
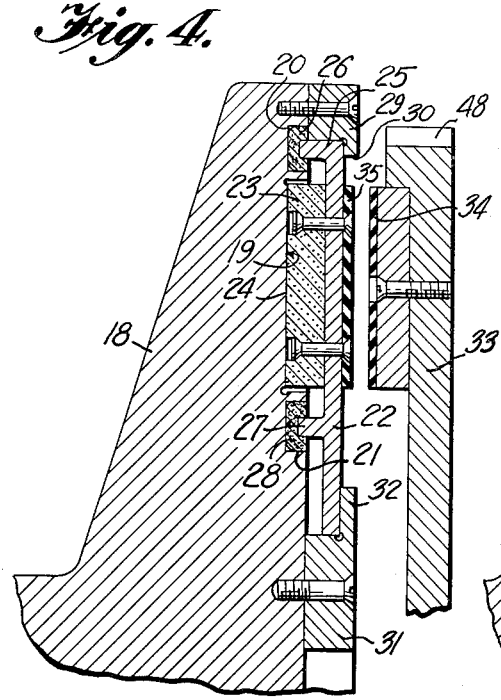
FIGURE 4 is an enlarged detail of one end of the spool showing the spool in brake-released free-spooling condition.
Figure 5:
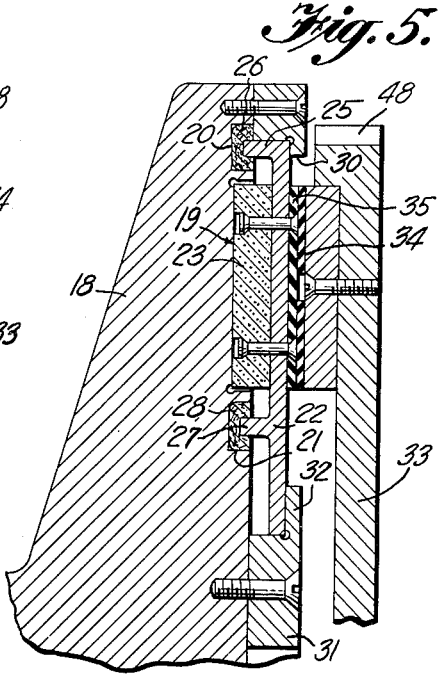
FIGURE 5 is a view similar to FIGURE 4 showing the parts in brake-applying position.

Referring to the drawings in detail, there is shown in FIGURES 1 to 5 inclusive, a somewhat conventional fishing reel 1 to which the improved brake structure is applied. The reel comprises a fixed frame including end plates 2 and 3, held in spaced relation by means of the rods 4. The end plates carry central bearings 5 and 6 which journal a shaft 7. A conventional crank 8 is fixed to one end of the shaft, so that the shaft may be rotated. Shaft 7 carries bearings 9 and 10 and a line spool 11 is mounted on the shaft for free rotation thereon. A thrust bearing 12 is interposed between the spool and the end plate 2, so that the spool will not bind when end pressure is placed upon it by action of the clutch member, as will be described. The end of shaft 7, adjacent plate 2, is recessed axially, as at 13, to receive a spring 14, which bears against the bottom of recess 13 and a cap plate 15 bridging the central opening in the end plate. A bearing plug is interposed between the spring and cap plate and bears upon a ball 16 seated upon the cap plate. The spring will urge the shaft toward the right, as viewed in FIGURE 1, or toward the end plate 3.

The spool has the usual cylindrical, line-receiving, central section 17 and the end flanges 18. The end flange adjacent end plate 3 is provided with a relatively wide annular recess 19 in its face adjacent the end plate, and a pair of narrower annular grooves 20 and 21, one groove on each side of the recess 19. An annular brake plate, or ring 22 is provided, which carries a ring 23 of oil-soaked cork, or brake lining, to seat snugly within the recess 19. The bottom 24 of recess 19 is highly polished to provide a smooth seating surface for the brake material. Annular plate 22 has an outer peripheral flange 25 with an inner edge that seats in a dirt and water seal 26 of cork, rubber or felt which fills the outer groove 20. The plate also carries an annular rib 27 to seat upon a similar seal 28 in the groove 21. The flange 25 and rib 27 in sealing contact with the gaskets, or seals, 26 and 28 effectively enclose the brake element 23 and the recess 19 in which it seats.

An outer retaining ring 29 is screwed to the spool flange and has a flange 30 which overlies the outer edge of the brake plate and its flange 25 to prevent separation of the plate and spool flange. An inner retaining ring 31 is also screwed to the spool flange and has an annular lip 32 which overlies the inner peripheral edge of the brake plate. The retaining rings also serve to hold the flange and rib in tight sealing relation with their gaskets, and further help to house and protect the brake member.

It will be evident that the brake member above described will be fully protected from water or other foreign matter, and that the brake and spool are free to rotate together as a unit. As long as no force is brought to bear against the brake plate, the spool is completely free for unimpeded rotation.

In order to retard the movement of the brake plate, or ring, and thereby create a braking action between the brake plate and spool, a clutch plate 33 carrying a ring of friction material 34 is fixed to, or integral with the shaft 7. The brake plate 22 carries a matching friction clutch ring 35. The clutch plate is caused to move toward and from the brake plate by movement of shaft 7 in an axial direction. Movement of the shaft to separate the clutch rings 34 and 35 is caused by the spring 14 bearing against the cap plate. This biases the clutch toward disengaged position and consequently the brake to released position. Clutch plate 33 is moved against the spring bias toward engaged position by means of a brake actuating mechanism 36. This may be any conventional brake actuator, and is shown as including a disk 37, fixed against rotative movement by means of a pin 38 which is slidable in an opening 39 in the end plate 3. The outer cylindrical surface of the disk is screw-threaded, as at 40, and an internally threaded annulus 41 is screwed upon it. Annulus 41 is, in fact, an external ring gear having teeth 42 for engagement with a spur gear 43 mounted upon a shaft 44 rotatable in a bushing 45 in the end plate 3. Any suitable handle, or finger piece, 46 may be affixed to the shaft.

It will be obvious that when shaft 44 is rotated, annulus 41 will also be rotated. As the disk 37 cannot rotate it will move axially of shaft 7. Rotation of the shaft 44 in a direction to cause the disk 37 to move away from the end plate 3 will, through the medium of spacer washer, or collar, 47, cause clutch plate 33 to move toward the brake plate and bring the clutching rings 34 and 35 into engagement. When the clutch rings engage, the brake plate will be held against movement and the brake ring 23 will exert a drag against the bottom surface of the recess in the spool flange, and thereby exert a braking force upon the spool. The degree of braking will be controlled by the pressure with which the clutch plate bears against the brake plate.

In a fishing reel, the drive for the spool is through the clutch plate and, therefore, through the brake. The clutch plate is provided with the usual ratchet teeth 48 and a pawl 49, pivoted to the end plate, engages the teeth to prevent reverse rotation of the clutch plate. The degree of braking applied will determine the force necessary to cause the spool to rotate relative to the clutch plate. Thus, the amount of drag to be put upon the spool may be carefully regulated.

With this arrangement, the interface between the brake ring and its coacting member is kept free of foreign material by the triple protection of constant contact, the interface being at the bottom of a recess, and a complete inner and outer seal to fully house the braking surface. Due to the fact that there is full separation between the clutch elements, the spool is free for unimpeded rotation when the clutch is disengaged.

In FIGURE 6, there is shown a modified structure wherein the seal grooves in the spool flange and the brake plate peripheral flange and annular rib are eliminated. The spool flange 50 has a brake recess 51 in which the brake ring 52 seats and runs. The brake ring is carried by a brake plate 53, which has on its opposite side a clutch face 54. The brake plate is held in position by a retaining ring 53' secured to the spool flange 50, as is the brake plate in the form previously described. Interposed between the brake ring and brake plate, is a sealing plate 55, which is of spring metal and has inner and outer sealing beads 56 and 57 adapted to yieldably bear against the surface of the spool flange to prevent entry of water and other foreign matter from the braking area. The sealing beads act in the same manner as the inner and outer seals of the form previously described.

In FIGURE 7, an application of the principle of the present invention to a driven type brake is shown. The brake consists of a drum 58, carried by a wheel or other member to be controlled. A brake ring, or liner, 59 is positioned within the drum and in constant contact with it. The brake ring is split and an insert 60 of resilient material is interposed between the split ring ends to lightly hold the ring in contact with the drum. Brake shoes 61, operated by a cam 62 are moved outwardly when desired to clutch with the brake ring to hold it against rotation with the drum to apply a braking action to the drum. At the same time, movement of the shoes controls the pressure of the brake ring against the drum.

All three of the variations disclosed operate upon the principle of a brake member carried by a member to be controlled, with means for clutching engagement with the brake member to resist its rotation. That form first described has advantages which are not present in the other forms.

While in the above several practical embodiments of the invention have been disclosed, it will be understood that the various details of structure shown and described are merely by way of illustration, and the invention may take other forms within the scope of the appended claims.

What is claimed is:

1. In a fishing reel having a fixed mounting frame, a shaft journalled thereon and having a crank on its end, and a flanged spool rotatably carried on the shaft, an improved brake for controlling rotation of the spool on the shaft comprising a brake plate having a brake ring on one side thereof in contact with one flange of the spool, an annular friction clutch member carried by the brake plate on the opposite side from the brake ring, a clutch plate mounted on the shaft for rotation therewith, a companion friction clutch member carried by the clutch plate for engagement with the clutch member on the brake plate upon movement of clutch plate axially of the spool, means to move the clutch plate axially of the spool to engage the clutch members and exert braking pressure upon the brake plate, and means carried by the brake plate annularly inward and outward of the brake ring in sealing engagement with the spool flange with which the brake ring is in engagement.

2. A fishing reel as claimed in claim 1 wherein the brake plate is an annulus, and retainer rings are secured to the flange of the spool with which the brake ring is in contact and overlap the inner and outer peripheries of the annular brake plate to mount the brake plate upon the spool.

3. In a fishing reel having a fixed mounting frame, a shaft journalled thereon and having a crank on its end and a flanged spool rotatably carried on the shaft, an improved brake for controlling rotation of the spool on the shaft comprising, a brake plate having a brake ring on one side thereof, one flange of the spool having an annular recess therein to seat the brake ring, an annular friction clutch member carried by the brake plate on the opposite side from the brake ring, a clutch plate mounted on the shaft for rotation therewith, a companion friction clutch member carried by the clutch plate for engagement with the clutch member on the brake plate upon movement of the clutch plate axially of the spool, means to move the clutch plate axially of the spool to engage the clutch members and exert braking pressure upon the brake plate, and means carried by the brake plate annularly inward and outward of the brake ring in sealing engagement with the spool flange inwardly and outwardly of said recess.

4. A fishing reel as claimed in claim 3 wherein the brake plate is an annulus, and retainer rings are secured to the flange of the spool having the recess and overlap the inner and outer peripheries of the annular brake plate to mount the brake plate upon the spool.

5. A fishing reel as claimed in claim 3 wherein the means in sealing contact with the spool flange comprises annular flanges carried by the brake plate, and the spool flange having the recess has annular grooves inwardly and outwardly of the recess with compressible sealing material in the grooves, and the annular flanges of the brake plate are in pressure contact with the sealing material.

6. A fishing reel as claimed in claim 3 wherein the means in sealing contact with the spool flange comprises annular spring beads in yielding contact with the spool flange.

References Cited in the file of this patent

UNITED STATES PATENTS

| | | |
|---|---|---|
| 1,547,238 | Russell et al. | July 28, 1925 |
| 2,126,227 | Stanley | Aug. 9, 1938 |
| 2,417,732 | Bland et al. | Mar. 18, 1947 |
| 2,531,610 | Butzman | Nov. 28, 1950 |
| 2,884,211 | Holahan | Apr. 28, 1959 |

FOREIGN PATENTS

| | | |
|---|---|---|
| 110,666 | Australia | May 22, 1940 |